(No Model.)

H. W. CRISPIN.
NUT LOCK.

No. 592,983. Patented Nov. 2, 1897.

Witnesses
J. R. Brittain.

Inventor
Haskell W. Crispin.
By his Attorneys,
C. A. Snow & Co.

UNITED STATES PATENT OFFICE.

HASKELL W. CRISPIN, OF DE WITT, MISSOURI.

NUT-LOCK.

SPECIFICATION forming part of Letters Patent No. 592,983, dated November 2, 1897.

Application filed April 20, 1897. Serial No. 632,996. (No model.)

*To all whom it may concern:*

Be it known that I, HASKELL W. CRISPIN, a citizen of the United States, residing at De Witt, in the county of Carroll and State of Missouri, have invented a new and useful Nut-Lock, of which the following is a specification.

This invention relates to improvements in nut-locks.

The object of the present invention is to improve the construction of nut-locks and to provide a simple, inexpensive, and efficient device capable of being readily applied to an ordinary bolt and nut without necessitating any alteration in the construction thereof, and adapted to lock a nut against accidental unscrewing and to permit the same to be readily removed when desired.

The invention consists in the construction and novel combination and arrangement of parts, as hereinafter fully described, illustrated in the accompanying drawings, and pointed out in the claim hereto appended.

Figure 1:
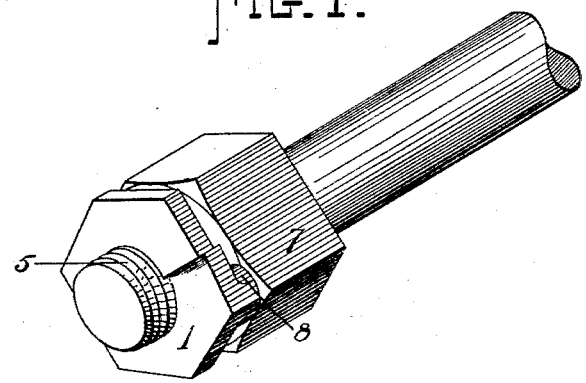
Figure 2:
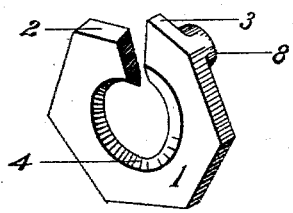
Figure 3:
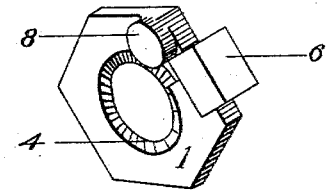
Figure 4:

In the drawings, Figure 1 is a perspective view of a nut-lock constructed in accordance with this invention and shown applied to a bolt and nut. Fig. 2 is a perspective view of the device detached. Fig. 3 is a similar view of the nut-lock, the ends of the plate or washer being held by a clamp to arrange the same for screwing on a bolt. Fig. 4 is a detailed perspective view of the clamp or holder.

Like numerals of reference designate corresponding parts in the several figures of the drawings.

1 designates a nut-lock comprising a plate or washer constructed of resilient metal and having a bolt-opening which is circular, the outer edges of the plate or washer being preferably hexagonal, as illustrated in the accompanying drawings, but any other form may be employed. The plate or washer is split to provide ends 2 and 3, and its inner edge is provided with a single screw-thread 4, which is adapted to engage the threads of a bolt 5 when the ends 2 and 3 of the plate or washer are held by a clamp or holder 6, as illustrated in Fig. 3 of the accompanying drawings. When the ends 2 and 3 are held in this manner, the plate or washer 1 may be screwed on the bolt similar to a nut, and after it has been arranged in contact with the nut 7 the clamp or holder 6 is removed, enabling the plate or washer to engage the face of the nut with all the force of its resiliency. The spring of the locking-plate holds the ends separated and maintains the thread normally out of pitch with that of the bolt to which the plate is to be applied. The end 3, which is adapted to engage the nut, is provided with a projection or toe 8, which fits or bears against the outer face of the same. The end 2 of the plate or washer remains interlocked with the screw-threads of the bolt and it forms a stop, and the inner edge of the plate or washer is oppositely beveled, as shown, to form the screw-thread 4.

The holder or clamp 6 is provided with parallel projecting flanges 7ª, which fit against the opposite faces of the nut-lock, straddling the edge thereof and spanning the split of the same. When it is desired to remove the nut-lock from the bolt, the clamp or holder is engaged with the edge of the same to hold the thread 4 in proper position for unscrewing and the nut-lock may then be readily rotated on the bolt.

The nut-lock is also capable of taking the place of a nut, and when used in this manner it is screwed up against the part to be held, and the clamp or holder is then detached, permitting the end 3 of the nut-lock to bear against such part with all of its spring-pressure.

It will be seen that the nut-lock is exceedingly simple and inexpensive in construction, that it is adapted to be applied to an ordinary bolt and nut without necessitating any alteration in the construction thereof, and that it is capable of securely locking a nut against accidental unscrewing. It will also be apparent that the nut-lock is capable of acting directly against the face of the nut and does not have to be clamped between the same and a plate or second nut, and that it may be readily removed when desired without injuring it or the bolt or nut.

What I claim is—

A nut-lock consisting of a spring locking-plate having a bolt-opening and provided with a thread, said spring-plate being split at one side and having its thread normally out of pitch with that of the bolt to which the locking-plate is to be applied, the end of the locking-plate nearer the nut of the bolt being provided with a projection or toe arranged to bear against the nut, and offset the said end from the nut to permit a tool or device to be applied to the locking-plate for holding the ends there-
5 of together to bring the thread of the plate in pitch with that of the bolt, substantially as and for the purpose described.

In testimony that I claim the foregoing as my own I have hereto affixed my signature in the presence of two witnesses.

HASKELL W. CRISPIN.

Witnesses:
 HENRY HERRMANN,
 S. E. STAFFORD.